United States Patent [19]
Fine

[11] Patent Number: 6,109,619
[45] Date of Patent: Aug. 29, 2000

[54] BACK UP GRIPPING AND A UNIVERSAL TOOL HOLDER

[76] Inventor: Seymour H. Fine, 138 Gaynor Pl., Glen Rock, N.J. 07452

[21] Appl. No.: 09/388,068

[22] Filed: Sep. 1, 1999

[51] Int. Cl.[7] .................................................. B23B 31/107
[52] U.S. Cl. ........................... 279/83; 30/392; 83/698.71; 403/362; 407/29.15
[58] Field of Search ...................... 279/83, 137; 403/362; 83/698.71, 698.91, 699.21; 30/329, 342, 392; 81/177.1; 407/29.15

[56] References Cited

U.S. PATENT DOCUMENTS

| 35,618 | 6/1862 | Mix | 279/83 |
|---|---|---|---|
| 427,335 | 5/1890 | MacMurtrie et al. | 279/83 |
| 739,537 | 9/1903 | Francis | 279/83 |
| 836,376 | 11/1906 | Fancher | 279/83 |
| 1,867,359 | 7/1932 | Higby | 279/83 |
| 2,346,364 | 4/1944 | Dowe | 81/177.1 |
| 2,383,151 | 8/1945 | Orskog | 407/29.15 |
| 3,186,726 | 6/1965 | Wilhelm et al. | 279/83 |
| 3,412,767 | 11/1968 | Green, Jr. | 279/83 |
| 3,781,025 | 12/1973 | D'Angelo | 279/83 |
| 4,265,057 | 5/1981 | Hoffman | 279/83 |

OTHER PUBLICATIONS

"Setscrews True Up Worn Pulley", American Machinist, p. 113, Jun. 1949.

*Primary Examiner*—Steven C. Bishop

[57] ABSTRACT

A method for gripping such objects as tool bits and other implements is an extension of principles employed by tool holders currently in use, which grip at one (primary) position along the shank length. This invention provides auxiliary gripping, or what I hereinafter call "back up gripping" at one or more positions in addition to the primary gripping position. A universal tool holder or handle is presented as one embodiment of the invention. The holder is an elongated cylindrical sleeve one end of which contains a gripping mechanism utilizing back up gripping. The other end of the holder allows for insertion of a strike rod which, when making contact internally with the gripped tool, transmits to the tool the impact of hammer blows made against the outer end of the rod. The gripping mechanism of the embodiment is comprised of two pairs of traversely adjustable screws which serve as jaws or grips. Each pair of jaws grips the shank in an orientation different from the gripping by the other pair. The two orientations might be perpendicular to each other or they might be related by some other central angle within a circle cross sectional to the longitudinal axis of the cylinder. Further, each pair grips at a different location along the length of the shank. Such gripping is shown to have advantages over conventional gripping in hand tools. It further suggests possibilities for innovations in gripping arrangements for power tools to remedy problems inherent in machines presently in use. The universal tool holder presented herein is designed to hold a larger variety of shapes and sizes of tool shanks than heretofore possible including tool shanks infinitesimally small and including tool shanks that may be bent, out of round, or otherwise irregular or misshapen.

2 Claims, 1 Drawing Sheet

250
BACK UP GRIPPING AND A UNIVERSAL TOOL HOLDER

BACKGROUND OF THE INVENTION

Tool users constantly seek to reconcile a need for tool holders having strong gripping power, with an additional need for multi-purpose holders so as to reduce tool box clutter. Some tools such as taps and screw extractors for example, require holders of differing sizes. Allen wrenches with which to adjust set screws, are sometimes available with permanent holders, sometimes without holders. Various holders are designed specifically to hold either a hack saw blade, a utility knife, a countersink, a file, a chisel, a piece of material to be soldered, and so on. Certain saber saw blades may be used only in their power machines because hand holders for them simply do not exist despite the reality that their use as hand tools is often desirable, affording the user a degree of control not possible at high speeds. The mechanic may attempt to overcome this insufficiency by gripping a saber saw blade with a pair of pliers or with a vice grip; both methods are cumbersome and unreliable.

Efforts to satisfy the need for a universal tool holder have resulted in the development of numerous devices which however, have either limited universality or weak holding power, or both.

U.S. Pat. No. 1,970,409 to O. Wiedman, shows a holder which is useful only with turning tools.

U.S. Pat. No. 3,957,096 to V. Rodman, shows a holder which is useful only with turning tools.

U.S. Pat. No. 4,566,357 to P. Carossino, shows a holder which is limited to holding only hexagonal tool bits.

U.S. Pat. No. 4,899,415 to R. Wheeler, shows a handle whose use is limited to the practice of gun cleaning.

U.S. Pat. No. 4,960,016 to R. Seals, shows a holder which is useful as a kit for storing and using (only) turning tools.

U.S. Pat. No. 5,299,475 to J. Stroop, shows a tool holder which addresses only the problem of grip size and not universality.

U.S. Pat. No. 5,819,594 to J. Sjovall, shows a hand grip for holding a turning shaft.

U.S. Pat. No. 5,480,166 to E. Milsop, shows a tool holder designed to use tool bits of various shapes and sizes in a ratchet-type turning implement. The bits are gripped between two-jaws, each tightened by an adjusting screw. This holder however, as with other such devices, has at least three limitations. First, the chuck can not grip a tool bit having lesser diameter than the size of the hole formed by the chuck's two facing V-shaped grooves. Second, the chuck will hold only tool bits conforming to the orientation of the V-grooves, that is, tool bits having straight shanks. Third, gripping strength is limited to the tightness of the two screws forcing the V-grooves against the shank. The V-groove blocks grip at one position along the shank. That is, as with all the other inventions cited above, they utilize only primary gripping. This is in contrast to the instant invention, what I refer to herein as auxiliary or "back up gripping." Further, the Milsop tool holder achieves versatility only if sockets are formed in advance on the side of its cylinder to accommodate various shapes of tools. The assortment of usable tools is thus limited to the list of sockets that have been provided. However, with back up gripping a tool holder offers versatility without prior structural preparation.

Such power tools as drills, lathes and milling machines, whether equipped with three or four jaw chucks, suffer from the same limitations as the tool holder described above. Their jaws are incapable for example, of gripping tapered shanks or shanks having otherwise nonparallel sides. This is so because the gripping edges of the jaws of a chuck remain always parallel to the longitudinal axis of the shank being gripped. A chuck is therefore capable of gripping a tapered shank at only one plane surface cross sectionally perpendicular to the longitudinal axis of the shank. This poses no difficulty with a shank whose sides are precisely parallel to the longitudinal axis, in which case the chuck grips at an infinitude of planes although the gripping occurs at only one position along the shank's length (primary gripping.) However the problem arises when the shank is irregular. In any event, sometimes gripping action is weak, in which case the tool slips within the chuck's jaws, the tool's effectiveness is diminished and its shaft is often abraded.

BRIEF SUMMARY OF THE INVENTION

The present invention arose mainly out of the challenge to create a universal holder that could be used to grip a greater variety of tools than heretofore possible with existing holders. The process led to the method of gripping wherein the tool shank is gripped at more than one (primary) position along the tool's shank (back up gripping.)

The geometric principle that a line is determined not by one point, but by two points, implies that for optimum stability a shank should be gripped at not one position along its length but at two. The present invention attempts to overcome deficiencies of the prior art by providing a method for securely gripping a plurality of tool shank types. It does so by providing for gripping to occur at not one, but two or more positions along the shank's length. In one embodiment of the invention a universal tool holder is provided which is designed to interchangeably and securely hold tools having shanks of different shapes and dimensions. That embodiment of the invention comprises a cylindrical tubular sleeve with back up gripping at one end to grip the tool bit. At that end four screws are turned into threaded holes in the cylinder to form a chuck or grip. When a tool bit is inserted into the holder and the screws are tightened against it, the tool bit is gripped securely, ready for use identically as though it had been equipped with its own permanent holder.

The invention resolves at least three limitations attributed to previous tool holders: First, it will grip infinitesimally small tool bits. Second, it will hold tool bits of any cross sectional shape, whether hexagonal, round, square, or even shanks which may be bent or otherwise irregularly shaped. Third, it is capable of gripping tool bits not at one but at two positions along the length of the shank. That is, it utilizes the principle of back up gripping. Further, the holder provides torque as needed for example, when holding Allen wrenches.

While the original object of the invention was to decrease the number of tool handles in the craftsman's tool collection, the added benefit was obtained of a holder not only more versatile, but superior in several ways to previous holders. The main advantage of the universal tool holder disclosed is its use of a principle herein called back up gripping which is explained below as gripping the tool shank at two locations on the shank instead of one location as commonly practiced at the present time. The principle is homologous to the presence of multiple set screws on arbors, mandrels, couplings and pulleys when these are attached to power transmission shafts. Multiple gripping is also manifest along the ways of crosslide mechanisms on machine tools. One therefore wonders why tool holders typically grip tools at only one position and not at multiple positions. The focus invention is believed to be the first to utilize back up gripping for holding tools.

The universal tool holder holds screw driver bits, socket shafts and a plurality of other tool bits of all types and sizes presently requiring individual handles. Thus the universal tool holder eliminates the present need for a large number of handles in the tool chest and in the shop.

BRIEF DESCRIPTION OF THE SEVERAL VIEWS OF THE DRAWING

One embodiment of the invention has been selected for purposes of illustration and description, and is shown in the accompanying drawings, wherein.

DETAILED DESCRIPTION OF THE INVENTION

Figure 1:
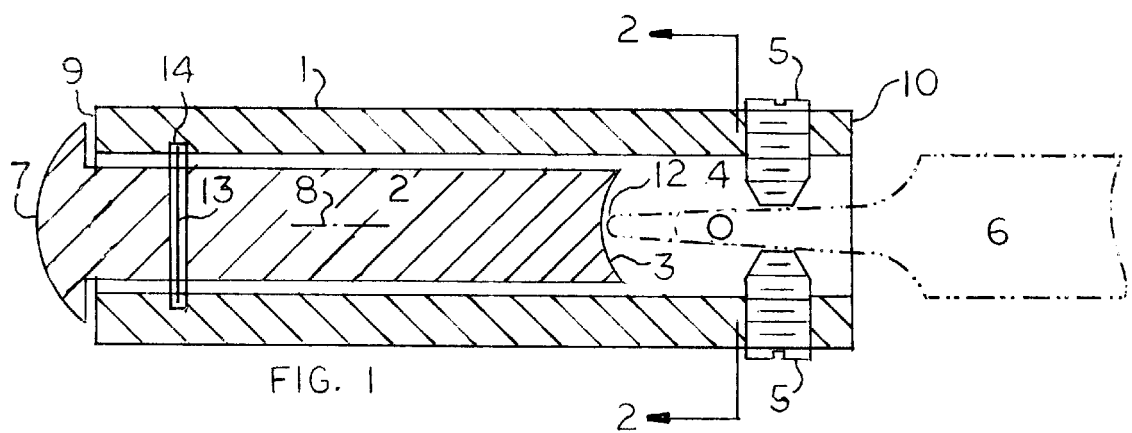
FIG. 1 is a longitudinal section view of a tool holder constructed according to the invention.

The principles of the invention are described in FIG. 1 which shows a universal tool holder that comprises a length of tubing or elongated cylinder 1. The first end surface of the cylinder, the hold end, extends transverse to longitudinal axis 8 and is shown as 9 in FIG. 1. The other end of the cylinder is a second end surface, the grip end 10, extending transverse to cylinder axis 8.

The cylinder 1 may be produced to any desired dimensions; a typical size might be approximately four inches in length and having outside diameter (OD) approximately one inch. Similarly, the internal diameter (ID) may vary according to specific requirements provided only that the wall of the cylinder is sufficiently thick to withstand tool action forces on the screws. That wall should accommodate at least three screw threads. The cylinder 1 may be constructed of any of various materials—brass, aluminum, steel or rigid plastic. The strike rod 2 will be made of steel, possible hardened, and a cup center machined out at its end 3. The cup center at 3 will have the contour resembling that of a typical cup center found in a lathe's tailstock where the cup center functions to support the end of a piece of material being turned. In the universal tool holder the purpose of the cup center at 3 is to serve as a contact point where the tool 6 will rest. The strike rod 2 is inserted into the hold end 9 of the cylinder 1 and is held in place there by means of a spring steel retention ring 13 fitted within a groove 14 which is bored concentrically on the interior of the cylinder.

A unique chucking mechanism is created proximate to the grip end 10 of the cylinder by means of four screws—two at 4 and two at 5. Because these screws function as jaws of a grip, they shall hereinafter be called "grip screws." In FIGS. 1 through 3 they are depicted as set screws but their purpose may be served by a variety of other threaded devices such as socket head cap screws, thumb screws, machine screws with knurled heads or any other devices capable of being adjusted toward or away from cylinder axis 8 whereby they will be disposed to grip tool shanks having different cross sectional configurations and different dimensions.

Figure 2:
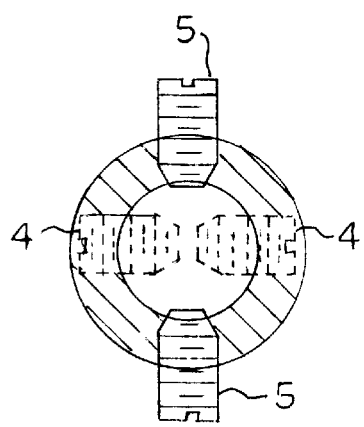
FIG. 2 is a transverse sectional view taken in a neighborhood of line 2—2 in FIG. 1 wherein screws 5 are maximally open while screws 4 are maximally closed and FIG. 3 is a transverse sectional view taken in a neighborhood of line 2—2 in FIG. 1 wherein both pairs of screws are closed almost, but not quite, completely. This view shows how the invention can grip a tool shank at position 11 no matter how small its cross sectional dimension.
Figure 3:
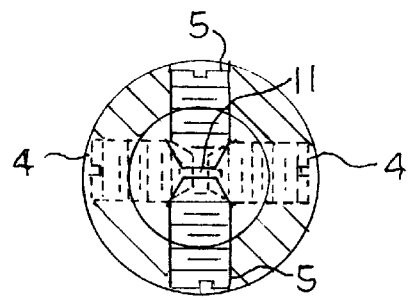

To accommodate the two pairs of grip screws 4 and 5, the cylinder is drilled and tapped as shown in FIG. I and FIG. 2. This machining will be performed to close tolerances in order that:

a) Grip screws 4 are aligned perpendicularly to grip screws 5 when the tool is viewed as shown in FIGS. 2 and 3.

b) When each pair of grip screws 4 and 5 are turned completely inward toward the cylinder axis 8, the points of each pair of grip screws will butt against each other as nearly attained in FIG. 3. Removing a tool from the universal tool holder requires loosening only one of each pair of grip screws. Similarly only one of each pair of grip screws need be tightened after inserting a tool of approximately the same shaft size as that most recently removed. Only when changing to a tool shank having significantly different diameter than the previous shank, need one adjust all four grip screws.

Hack saw and saber saw blades are particularly susceptible to holding with the universal tool holder. In such application, one pair of grip screws grips the flat surface of the blade while the other pair grips the sharp top and bottom edges of the blade thus significantly restraining the forces tending to cause vertical instability, especially when sawing dense or fibrous materials. Screw positions in FIG. 2 approximate the setup for a hack saw blade. Usage is enhanced and "binding" is prevented by inserting the blade into the universal tool holder with its teeth cutting on the pulling motion rather than on the pushing motion Likewise, the universal tool holder holds taps of all sizes thus eliminating the present need for having tapholders on hand of several sizes. The universal tool holder holds taps more conveniently than typical present tapholders many of which have a sliding rod to provide leverage; that sliding rod often inhibits holding. With the universal tool holder, excellent leverage is usually enjoyed because of the firmer grip which it provides. Should added leverage be needed with the universal tool holder, the following practice is easily done: by replacing one of the four grip screws with a significantly longer screw, the screw serves as a handy lever for turning the tap. It also serves as a guide to gauging perpendicularity of the tap to the work. These two features are improvements over the turning and holding capabilities of present tapholders.

The universal tool holder described herein may also be used to hold a variety of punches and chisels which are to receive impact as from hammer blows. When used for holding chisels, punches or other impact tools, and with the strike rod in place, the operator applies palm pressure as required for machining plastic materials such as wood, or the cap 7 of the rod may be struck as with a hammer to chip away stone for example. The impact of a hammer blow upon the cap 7 of the rod 2 is translated to the tool 6 and thence to the work. The bottom 3 of the strike rod 2 is turned to a concave surface resembling essentially that of a cup center of a lathe's tailstock. That bottom end is positioned to make contact with the tool at the time of insertion.

The concept of back up gripping as set forth in this disclosure is hereby claimed to be capable of extrapolation beyond the instances described herein. The same principle as back up gripping may be employed to effect three or more gripping positions along the length of a shank. Further, where back up gripping is described herein to mean two gripping positions perpendicular to each other, this disclosure does not exclude applications wherein second, third or more positions of grip may be at angles other than 90 degrees to each other. Certain applications may benefit from several gripping positions arranged in a helical pattern either for sturdier gripping or where warranted by the physical condition of the shank. For one example assume a part which has the shape of a sphere from which a rod protrudes from the center outward perpendicular to the surface of the sphere (shaped as a lollipop). When the rod has small diameter relative to the sphere's circumference, to attempt to machine certain surfaces of the sphere on a lathe, it would be impractical to chuck the rod because then the sphere would tend to fly outwards due to centrifugal force. The problem might be resolved by use of complicated jigs. On the other hand were the lathe equipped with back up gripping such as that proposed herein, then the part could be gripped as follows:

a) the sphere could be held partially in the machine's chuck and b) the rod could be gripped by a back up grip comprised of a pair of collinear grip screws positioned on the machine's shaft behind the chuck.

In such an application neither of the above cited gripping methods a) nor b) by itself, would suffice to grip adequately, but the combined arrangement causes considerably increased holding power to be exerted on the material, certainly adequate for machining purposes. Further, to provide for such functionality requires no more retrofitting than to drill and tap a pair of collinear holes in the driven shaft of the machine at a desired position (or positions) and perpendicular to the longitudinal axis of said shaft. Set screws are inserted into said holes and these comprise and are utilized as the back up grip.

Every effort has been made in this patent application to employ terminology sufficiently general to include possibilities beyond the specific product depicted in the drawing and described in the text. The drawings and descriptions included herein show specific structural features and embodiments of a universal tool holder with back up gripping. It will be appreciated by those skilled in the art to which the invention relates that the present invention can be practiced in various alternative forms and configurations and that other various substitutions and modifications may be made to the illustrated embodiment without departing from the spirit and scope of the invention as defined by the claims listed below. Further, the previously detailed descriptions of the preferred embodiment of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What I claim as my invention is:

1. A universal toolholder comprising an elongated cylinder with a longitudinal axis;

an end surface at each of the two ends of the cylinder, each said end surface extending transverse to said longitudinal axis;

a gripping arrangement proximate to the first end surface comprised of at least two pairs of set screws such that the screws in each pair enter the cylinder through holes 180 degrees apart and are coplanar and so that when both screws are turned maximally inward their points make contact;

a primary pair of said screws is positioned collinearly and transverse to the longitudinal axis of an inserted shank and a second pair of said screws is positioned transverse to the longitudinal axis of the shank and axially spaced from said primary pair of screws, which second pair of screws is positioned orthogonally to the axis of the primary pair of screws.

2. A universal toolholder comprising an elongated cylinder as described in claim 1 wherein a loosely fitting round headed rod is inserted into the second end surface; the end of the rod opposite the head has a cup point; and a circular wire retention spring is embedded within a groove scored on the interior of the cylinder, which spring exerts a holding force upon the rod.

\* \* \* \* \*